United States Patent
Salmela et al.

(10) Patent No.: US 11,968,529 B2
(45) Date of Patent: Apr. 23, 2024

(54) AUTHENTICATION OF A RADIO COMMUNICATION DEVICE TO A NETWORK

(71) Applicant: Telefonaktiebolaget LM Ericsson (PUBL), Stockholm (SE)

(72) Inventors: Patrik Salmela, Espoo (FI); Per Ståhl, Klagshamn (SE); Kristian Slavov, Espoo (FI); Vesa Lehtovirta, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 76 days.

(21) Appl. No.: 17/593,267

(22) PCT Filed: Mar. 15, 2019

(86) PCT No.: PCT/EP2019/056564
§ 371 (c)(1),
(2) Date: Sep. 14, 2021

(87) PCT Pub. No.: WO2020/187387
PCT Pub. Date: Sep. 24, 2020

(65) Prior Publication Data
US 2022/0201479 A1    Jun. 23, 2022

(51) Int. Cl.
*H04W 12/06* (2021.01)
*H04W 12/041* (2021.01)
(Continued)

(52) U.S. Cl.
CPC ....... *H04W 12/068* (2021.01); *H04W 12/041* (2021.01); *H04W 12/0431* (2021.01); *H04W 12/106* (2021.01)

(58) Field of Classification Search
CPC ............. H04W 12/068; H04W 12/041; H04W 12/0431; H04W 12/106
See application file for complete search history.

(56) References Cited

U.S. PATENT DOCUMENTS

| 2006/0031515 A1 | 2/2006 | Van Gassel et al. |
| 2012/0264375 A1 | 10/2012 | Shankaranarayanan |

(Continued)

FOREIGN PATENT DOCUMENTS

| CN | 106716920 A | 5/2017 |
| CN | 107637038 A | 1/2018 |
| WO | 2018 019882 A1 | 2/2018 |

OTHER PUBLICATIONS

"Study on the security aspects of the next generation system (Release 14)," 3GPP TR 33.899 V1.3.0, Aug. 2017, 605 Pages.*

(Continued)

*Primary Examiner* — Matthew T Henning
(74) *Attorney, Agent, or Firm* — Baker Botts L.L.P.

(57) ABSTRACT

There is provided mechanisms for authenticating a first radio communication device with a network. A method is performed by the first radio communication device. The method comprises obtaining credentials for a network subscription to the network. The method comprises obtaining an upper part of a radio protocol stack, according to which radio protocol stack the first radio communication device is configured to communicate with the network. The method comprises authenticating with the network. The method comprises providing, to a second radio communication device, at least one key, as derived from the credentials during the authenticating, for use by the second radio communication device when executing the remaining part of the radio protocol stack for communication between the second radio communication device and the network.

20 Claims, 8 Drawing Sheets

(51) Int. Cl.
*H04W 12/0431* (2021.01)
*H04W 12/106* (2021.01)

(56) References Cited

U.S. PATENT DOCUMENTS

| | | | |
|---|---|---|---|
| 2016/0014127 A1 | 1/2016 | Mohebbi | |
| 2018/0295032 A1* | 10/2018 | Yu | H04L 41/5058 |
| 2019/0021043 A1* | 1/2019 | Youn | H04W 36/0055 |
| 2019/0268766 A1* | 8/2019 | Luft | H04W 12/06 |

OTHER PUBLICATIONS

Dan Forsberg, "LTE key management analysis with session keys context", Computer Communications, vol. 33, Issue 16, 2010, pp. 1907-1915.*

ETSI TS 133 501 V15.1.0 "Security architecture and procedures for 5G System", Jul. 2018, 150 pages.*

Wikipedia Entry for Bluetooth, archived on Mar. 13, 2018, and retrieved on Sep. 1, 2023 at https://web.archive.org/web/20180313191550/https://en.wikipedia.org/wiki/Bluetooth.*

PCT International Search Report issued for International application No. PCT/EP2019/056564—dated Nov. 19, 2019.

PCT Written Opinion of the International Searching Authority issued for International application No. PCT/EP2019/056564—dated Nov. 19, 2019.

Search Report issued for CN 2019800941913—dated Mar. 15, 2019.

Official Action issued for CN Patent Application No. 201980094191.3—dated May 17, 2023.

Summary Translation of First Office Action issued for Chinese Application No. 201980094191.3 (Chinese language Office Action cited in IDS dated May 22, 2023)—dated May 17, 2023.

Second Office Action issued for Chinese Patent Application Serial No. 201980094191.3—dated Nov. 8, 2023.

* cited by examiner

AUTHENTICATION OF A RADIO COMMUNICATION DEVICE TO A NETWORK

PRIORITY

This nonprovisional application is a U.S. National Stage Filing under 35 U.S.C. § 371 of International Patent Application Serial No. PCT/EP2019/056564 filed Mar. 15, 2019 and entitled "AUTHENTICATION OF A RADIO COMMUNICATION DEVICE TO A NETWORK" which is hereby incorporated by reference in its entirety.

TECHNICAL FIELD

Embodiments presented herein relate to a method, a first radio communication device, a computer program, and a computer program product for authenticating the first radio communication device with a network. Embodiments presented herein further relate to a method, a second radio communication device, a computer program, and a computer program product for enabling communication between the first radio communication device and the network.

BACKGROUND

In communications networks, there may be a challenge to obtain good performance and capacity for a given communications protocol, its parameters and the physical environment in which the communications network is deployed.

For example, cellular communication systems (such as second (2G), third (3G), fourth (4G), and fifth (5G) generations telecommunication systems) are typically accessed over an air, or radio, interface using the radio modem in the radio communication device. The radio communication device has subscription credentials that are used for authenticating the radio communication device to the network, and for authenticating the network to the radio communication device. The credentials are stored in the subscriber database in the core network, e.g. in a Home Subscriber Server (HSS) or a Home Location Register (HLR). The authentication might be performed using the Authentication and Key Agreement (AKA) protocol, which is run on the Non-Access Stratum (NAS) layer, between the radio communication device and a mobility entity, such as the Mobility Management Entity (MME) in 4G generation telecommunication systems. As a result of running the AKA protocol, the MME and the radio communication device both share key material used to protect signalling between the radio communication device and the MME using the NAS protocol. From the key material, the radio communication device and the MME derive further keys that are used to protect the Access Stratum (AS) communication, such as radio resource control (RRC) signaling and user plane signalling between the radio communication device and the network.

FIG. 1 is a signalling diagram for NAS security setup between a radio communication device and a network FIG. 1 is showing the details in case of fourth generation (4G) telecommunication system, and signalling flows are similar for the other generations telecommunication systems.

S1: The radio communication device attaches to the network by sending an attach request containing its identity (IMSI in 4G). The message also contains the network capabilities of the radio communication device, indicating security algorithms supported by it.

S2: The MME, based on the received identity, requests authentication vectors (AVs) from the subscriber database (HSS in 4G).

S3: The HSS generates AVs for the subscription identified by the provided identity.

S4: The HSS provides the AVs to the MME, which is in charge of authenticating the radio communication device.

S5: The MME and the radio communication device run the AKA protocol to mutually authenticate each other and the radio communication device generates the key K_ASME.

S6: The MME selects NAS security algorithms based on the received network capabilities of the radio communication device and derives keys K_NAS_enc and K_NAS_int from K_ASME.

S7: The MME sends the NAS security mode command message to the radio communication device. The message contains the algorithms selected by the MME, and is integrity protected using the K_NAS_int key.

S8: The radio communication device generates the corresponding NAS keys (K_NAS_enc and K_NAS_int) and verifies the integrity of the received message.

S9: The radio communication device responds with a NAS security mode complete message, which is encrypted and integrity protected using the NAS keys.

S10: The MME verifies the integrity of the message and decrypts it.

S11: All future NAS messages are encrypted and integrity protected.

FIG. 2 is a signalling diagram for AS security setup between a radio communication device and a network FIG. 2 is showing the details in case of fourth generation (4G) telecommunication system, and signalling flows are similar for the other generations telecommunication systems.

S21: The MME derives key K_eNB from K_ASME.

S22: The MME delivers K_eNB in an S1AP setup message to the eNB of the network. The message also includes the network capabilities of the radio communication device.

S23: The eNB selects RRC security algorithm and user plane security algorithm based on the received network capabilities.

S24: The eNB derives AS keys K_RRCint, K_RRCenc, K_UPenc from the received K_eNB.

S25: The eNB sends an AS security mode command message to the radio communication device, including the selected algorithms. The message is integrity protected with K_RRCint.

S26: The radio communication device derives the corresponding K_eNB from K_ASME, and further derives the AS keys from K_eNB. The radio communication device also verifies the integrity of the received message.

S27: The radio communication device responds with an AS security mode complete message, which is integrity protected with the key K_RRCint.

S28: The eNB verifies the integrity of the received message.

S29: All future RRC messages are integrity protected and encrypted, and all future user plane messages are encrypted.

However, in some aspects the radio communication device might not have a direct connection to the network.

For example, one example is so-called capillary networks where the radio communication device (for example when being a constrained device or Internet of things (IoT) device) connects to the network via another device, such as a capillary gateway (CGW). A low power radio interface, such as Bluetooth low energy (BLE), might be used for the communication between the radio communication device and the CGW. The CGW then provides the radio communication device with global Internet Protocol (IP) connectivity, often via 3GPP radio access. This is similar to mobile phone tethering.

It is possible for the radio communication device to access the core network (Evolved Packet Core (EPC) network in 4G and 5G core (5GC) network in 5G) via a non-cellular access network. Using such non-cellular access networks, devices with 3GPP credentials but without 3GPP radio access capabilities can also access the services provided by the 3GPP core network. However, the functionality is restricted. For example, the radio communication device cannot be paged over non-cellular network access.

In capillary networks, the radio communication device typically obtains its IP address from the CGW, which either allocates the address from an IPv6 prefix allocated to it by the core network or by performing network address translation (NAT). Especially, when performing NAT, the radio communication device will not be easily reachable from the network. Likewise, the core network cannot see the radio communication device and thus not bill it for services rendered. This means that the CGW will be charged for all traffic generated by all radio communication devices it serves in the capillary network.

When obtaining network access through a CGW, the radio communication device will not have access to services in the core network as the radio communication device will not authenticate to the core network.

The radio communication device could obtain access to services in the core network if the radio communication device connects directly through a non-cellular network access. However, such radio communication devices are not reachable from the network side if they are in idle mode since paging is not supported via non-cellular network access. Keeping those radio communication devices always in connected mode would consume unnecessarily resources, which is especially not desirable in case of constrained devices or IoT devices. In addition, this would add overhead in the case of untrusted non-cellular access network since an IP security (IPsec) tunnel could be required from the radio communication device to the core network.

Currently, if a radio communication device is to be enabled for 3GPP services the radio communication device needs specific hardware: a Universal Integrated Circuit Card (UICC), commonly called a Subscriber identity Module (SIM) card, or an embedded Universal Integrated Circuit Card for handling the 3GPP credentials or profile, and a modem/radio interface configured for 3GPP connectivity. This means extra cost and potentially also an increase in physical size of the radio communication device, which both can be issues especially for constrained device and IoT devices. There are mechanisms, like the ones described above for connectivity. However, the radio communication devices are then not themselves visible in the core network as a subscriber and cannot be charged, and/or are not reachable via paging.

Hence, there is still a need for improved mechanism for a non-3GPP enabled radio communication device to be enabled for 3GPP services.

SUMMARY

An object of embodiments herein is to provide mechanisms that enable a non-3GPP enabled radio communication device to be enabled for 3GPP services, without being reliant on the radio communication device needing specific hardware.

According to a first aspect there is presented a method for authenticating a first radio communication device with a network. The method is performed by the first radio communication device. The method comprises obtaining credentials for a network subscription to the network. The method comprises obtaining an upper part of a radio protocol stack, according to which radio protocol stack the first radio communication device is configured to communicate with the network. The method comprises authenticating with the network. The method comprises providing, to a second radio communication device, at least one key, as derived from the credentials during the authenticating, for use by the second radio communication device when executing the remaining part of the radio protocol stack for communication between the second radio communication device and the network.

According to a second aspect there is presented a first radio communication device for authenticating the first radio communication device with a network. The first radio communication device comprises processing circuitry. The processing circuitry is configured to cause the first radio communication device to obtain credentials for a network subscription to the network. The processing circuitry is configured to cause the first radio communication device to obtain an upper part of a radio protocol stack, according to which radio protocol stack the first radio communication device is configured to communicate with the network. The processing circuitry is configured to cause the first radio communication device to authenticate with the network. The processing circuitry is configured to cause the first radio communication device to provide, to a second radio communication device, at least one key, as derived from the credentials during the authenticating, for use by the second radio communication device when executing the remaining part of the radio protocol stack for communication between the second radio communication device and the network.

According to a third aspect there is presented a first radio communication device for authenticating the first radio communication device with a network. The first radio communication device comprises an obtain module configured to obtain credentials for a network subscription to the network. The first radio communication device comprises an obtain module configured to obtain an upper part of a radio protocol stack, according to which radio protocol stack the first radio communication device is configured to communicate with the network. The first radio communication device comprises an authenticate module configured to authenticate with the network. The first radio communication device comprises a provide module configured to provide, to a second radio communication device, at least one key, as derived from the credentials during the authenticating, for use by the second radio communication device when executing the remaining part of the radio protocol stack for communication between the second radio communication device and the network.

According to a fourth aspect there is presented a computer program for authenticating a first radio communication device with a network. The computer program comprises computer program code which, when run on processing circuitry of the first radio communication device, causes the first radio communication device to perform a method according to the first aspect.

According to a fifth aspect there is presented a method for enabling communication between a first radio communication device and a network, wherein the first radio communication device is configured to communicate with the network according to a radio protocol stack. The method is performed by a second radio communication device. The method comprises obtaining at least one key, as derived from credentials of the first radio communication device during authentication of the first radio communication device with the network. The method comprises obtaining, as payload and from the first radio communication device, signalling in accordance with an upper part of the radio protocol stack. The method comprises forwarding the signalling to the network by executing the remaining part of the radio protocol stack, wherein the at least one key is for use by the second radio communication device when executing the remaining part of the radio protocol stack.

According to a sixth aspect there is presented a second radio communication device for enabling communication between a first radio communication device and a network, wherein the first radio communication device is configured to communicate with the network according to a radio protocol stack. The second radio communication device comprises processing circuitry. The processing circuitry is configured to cause the second radio communication device to obtain at least one key, as derived from credentials of the first radio communication device during authentication of the first radio communication device with the network. The processing circuitry is configured to cause the second radio communication device to obtain, as payload and from the first radio communication device, signalling in accordance with an upper part of the radio protocol stack. The processing circuitry is configured to cause the second radio communication device to forward the signalling to the network by executing the remaining part of the radio protocol stack, wherein the at least one key is for use by the second radio communication device when executing the remaining part of the radio protocol stack.

According to a seventh aspect there is presented a second radio communication device for enabling communication between a first radio communication device and a network, wherein the first radio communication device is configured to communicate with the network according to a radio protocol stack. The second radio communication device comprises an obtain module configured to obtain at least one key, as derived from credentials of the first radio communication device during authentication of the first radio communication device with the network. The second radio communication device comprises an obtain module configured to obtain, as payload and from the first radio communication device, signalling in accordance with an upper part of the radio protocol stack. The second radio communication device comprises a forward module configured to forward the signalling to the network by executing the remaining part of the radio protocol stack, wherein the at least one key is for use by the second radio communication device when executing the remaining part of the radio protocol stack.

According to an eight aspect there is presented a computer program for enabling communication between a first radio communication device and a network, the computer program comprising computer program code which, when run on processing circuitry of a second radio communication device, causes the second radio communication device to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously these methods, these radio communication devices, these computer programs, and this computer program product enable the radio communication device to be enabled for services available by the network, without the radio communication device needing specific hardware and/or software for this purpose.

Advantageously these methods, these radio communication devices, these computer programs, and this computer program product enables the first radio communication device to obtain a 3GPP identity, have 3GPP presence, and access 3GPP services (such as having support for 3GPP global coverage and reachability as well as the capability to be paged), without having to have any dedicated 3GPP hardware.

Advantageously these methods, these radio communication devices, these computer programs, and this computer program product enables individual billing and charging of the first radio communication device.

Advantageously these methods, these radio communication devices, these computer programs, and this computer program product do not require any modification of the 3GPP core network or 3GPP radio access network.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
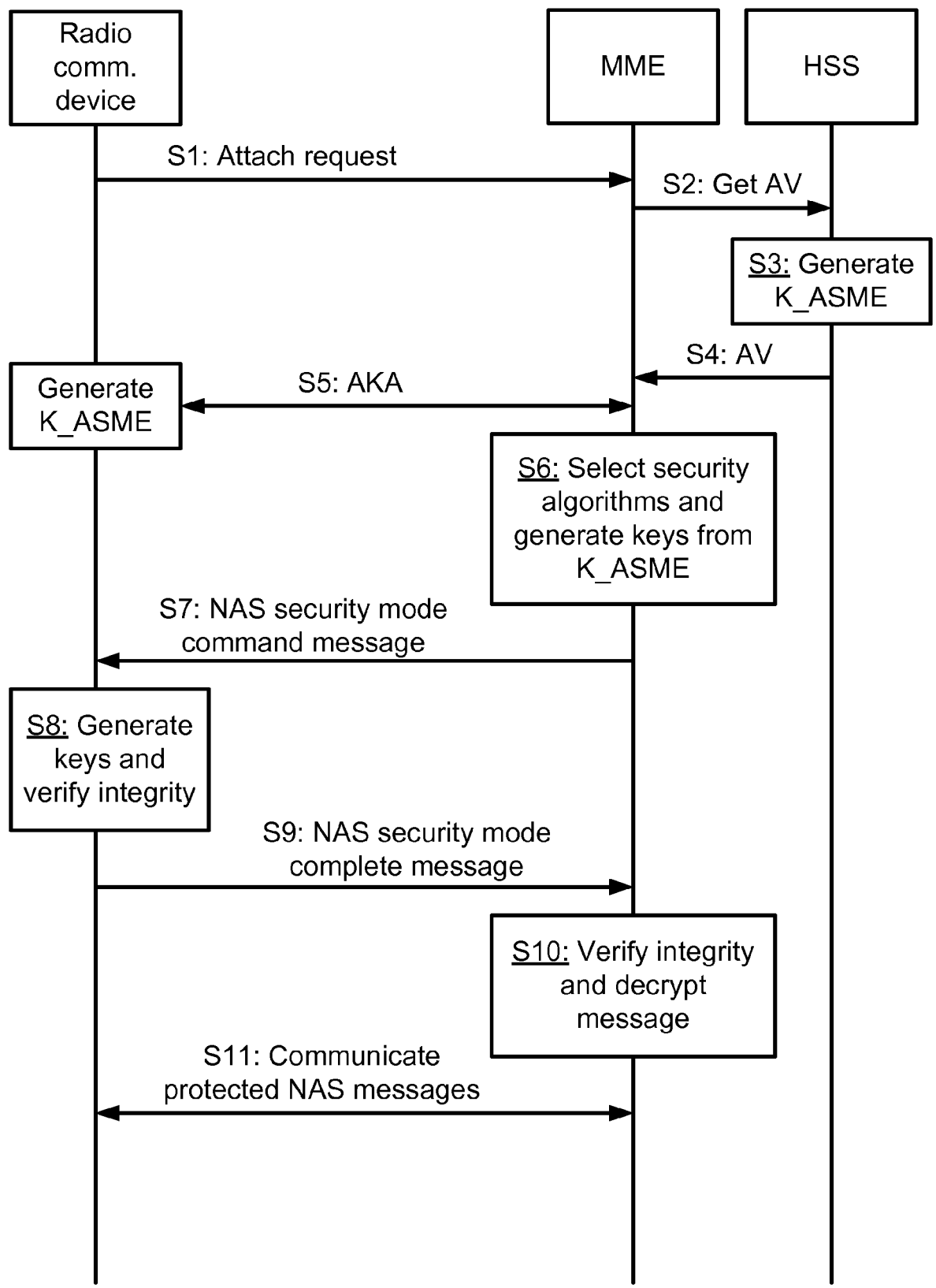
FIG. 1 is a signalling diagram for NAS security setup between a radio communication device and a network.
Figure 2:
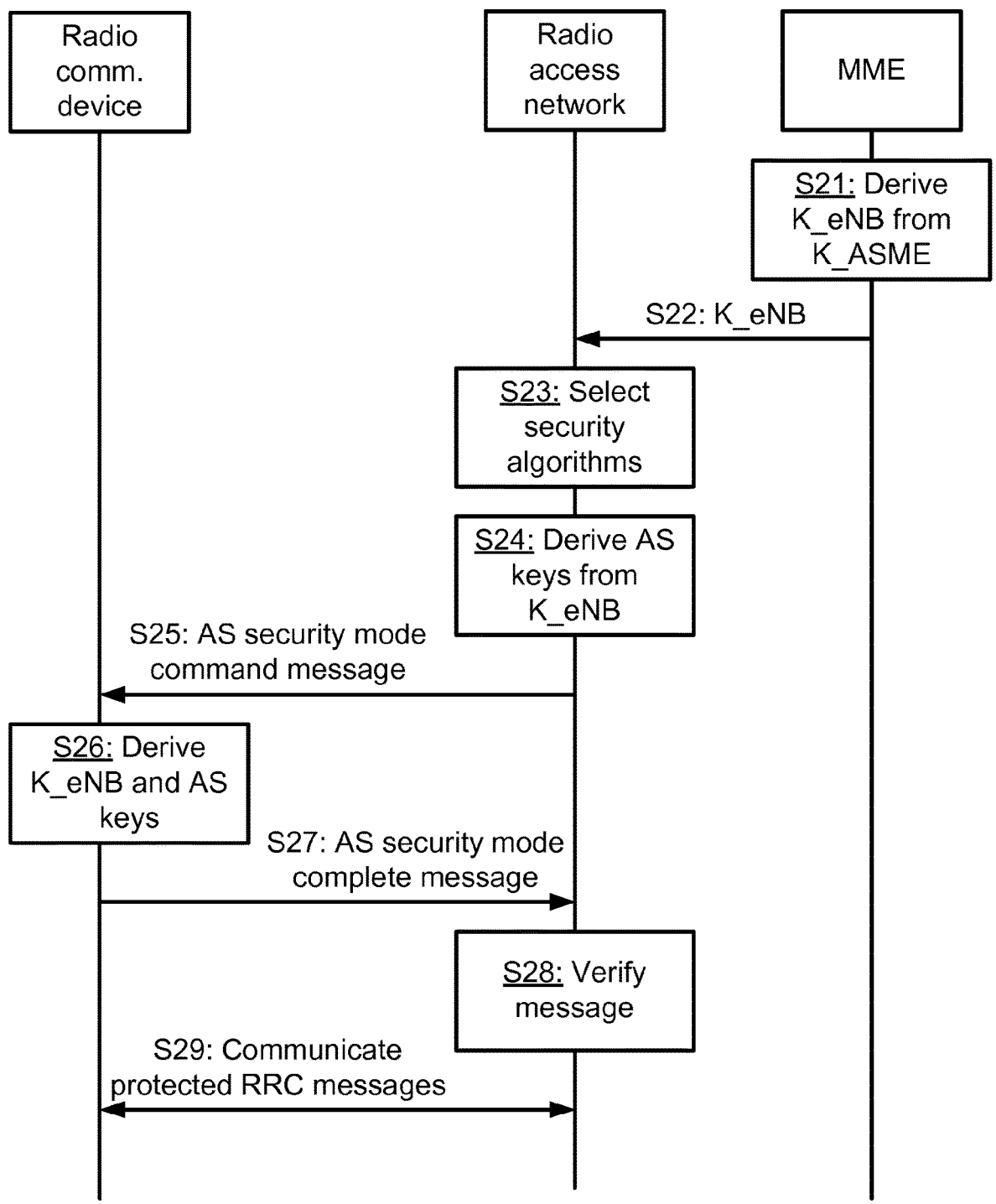
FIG. 2 is a signalling diagram for AS security setup between a radio communication device and a network.
Figure 3:
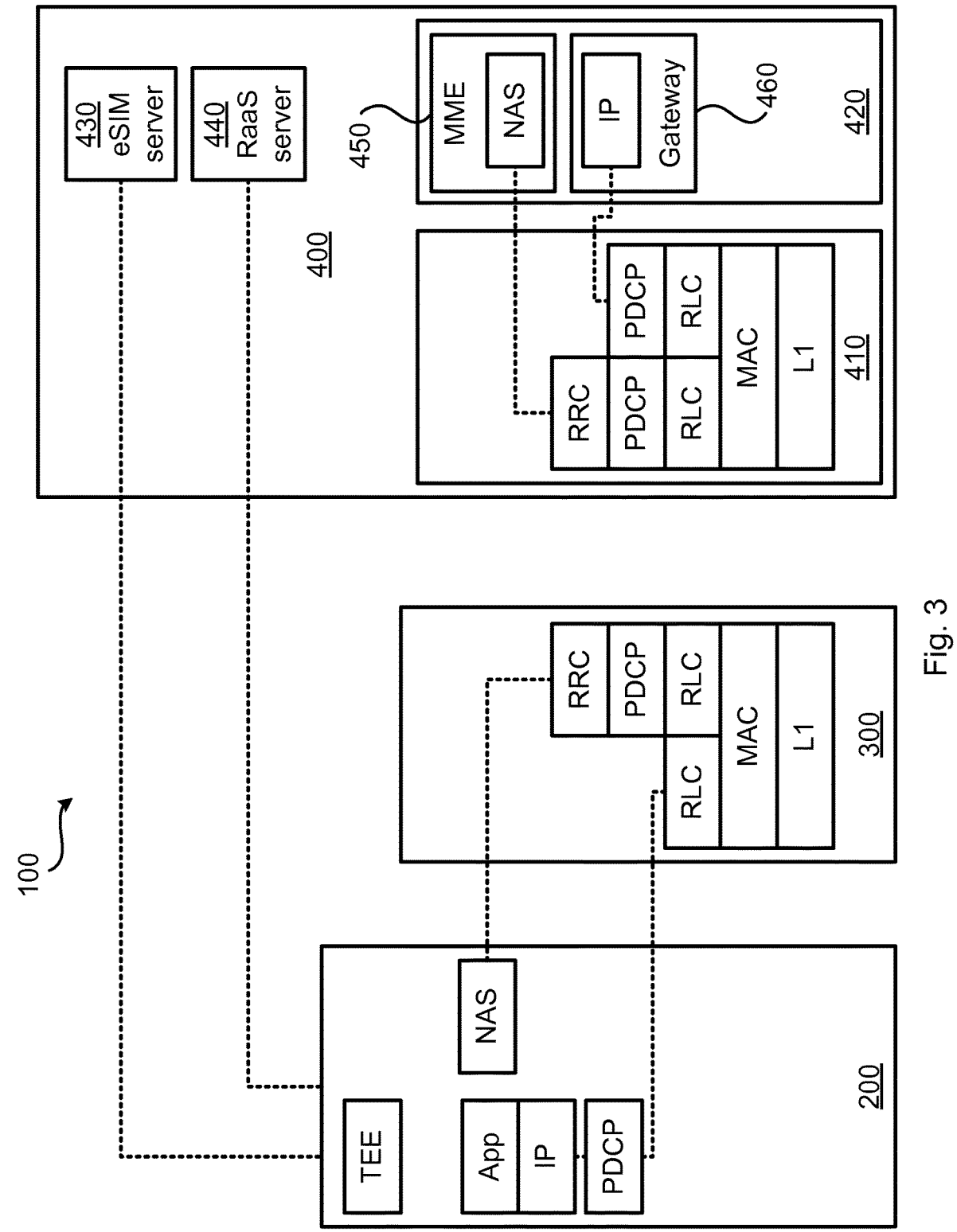
FIG. 3 is a schematic diagram illustrating a communication system according to embodiments.

FIG. 3 is a schematic diagram illustrating a high-level architecture of a communication system 100 in accordance with embodiments disclosed herein. The communication system 100 comprises a first radio communication device 200 having a trusted execution environment (TEE), a second radio communication device 300, and a network 400. In some examples the first radio communication device 200 and the second radio communication device 300 are pieces of user equipment (UE), mobile phones, smartphones, or the likes. In some examples the first radio communication device 200 is a constrained device, IoT device, network equipped sensor, machine type communication device, or network equipped vehicle. In some examples the network 400 is a 3GPP network.

In turn, the network 400 comprises a radio access network 410, a core network 420, an eSIM server 430 and a Radio access as a Service (RaaS) server 440. In turn, the core network 420 comprises an MME 450 and a gateway 460 (such as a Serving Gateway (SGW) and/or a Packet Gateway (PGW)). In case of a 5G telecommunications system, and in the context of this disclosure, the network entity corresponding to MME is mainly the Access Management Function (AMF) although some functionality of the MME can be implemented elsewhere, and the network entity corresponding to SGW or PGW is the User Plane Function (UPF).

FIG. 3 further shows both user plane (UP) and control plane (CP) radio protocol stacks. For the control plane radio protocol stacks, the first radio communication device 200 itself hosts the NAS protocol, but RRC and layers below it (i.e., Packet Data Convergence Protocol (PDCP) layer, Radio Link Control (RLC) layer, Medium Access Control (MAC) layer, and physical layer (L1)) are delegated to the second radio communication device 300. For the user plane radio protocol stack, the first radio communication device 200 hosts the application layer, IP layer and PDCP layer. RLC and layers below it are delegated to the second radio communication device 300.

The embodiments disclosed herein in particular relate to mechanisms for authenticating a first radio communication device 200 with a network 400 and enabling communication between a first radio communication device 200 and a network 400. In order to obtain such mechanisms there is provided a first radio communication device 200, a method performed by the first radio communication device 200, a computer program product comprising code, for example in the form of a computer program, that when run on processing circuitry of the first radio communication device 200, causes the first radio communication device 200 to perform the method. In order to obtain such mechanisms there is further provided a second radio communication device 300, a method performed by the second radio communication device 300, and a computer program product comprising code, for example in the form of a computer program, that when run on processing circuitry of the second radio communication device 300, causes the second radio communication device 300 to perform the method.

Figure 4:
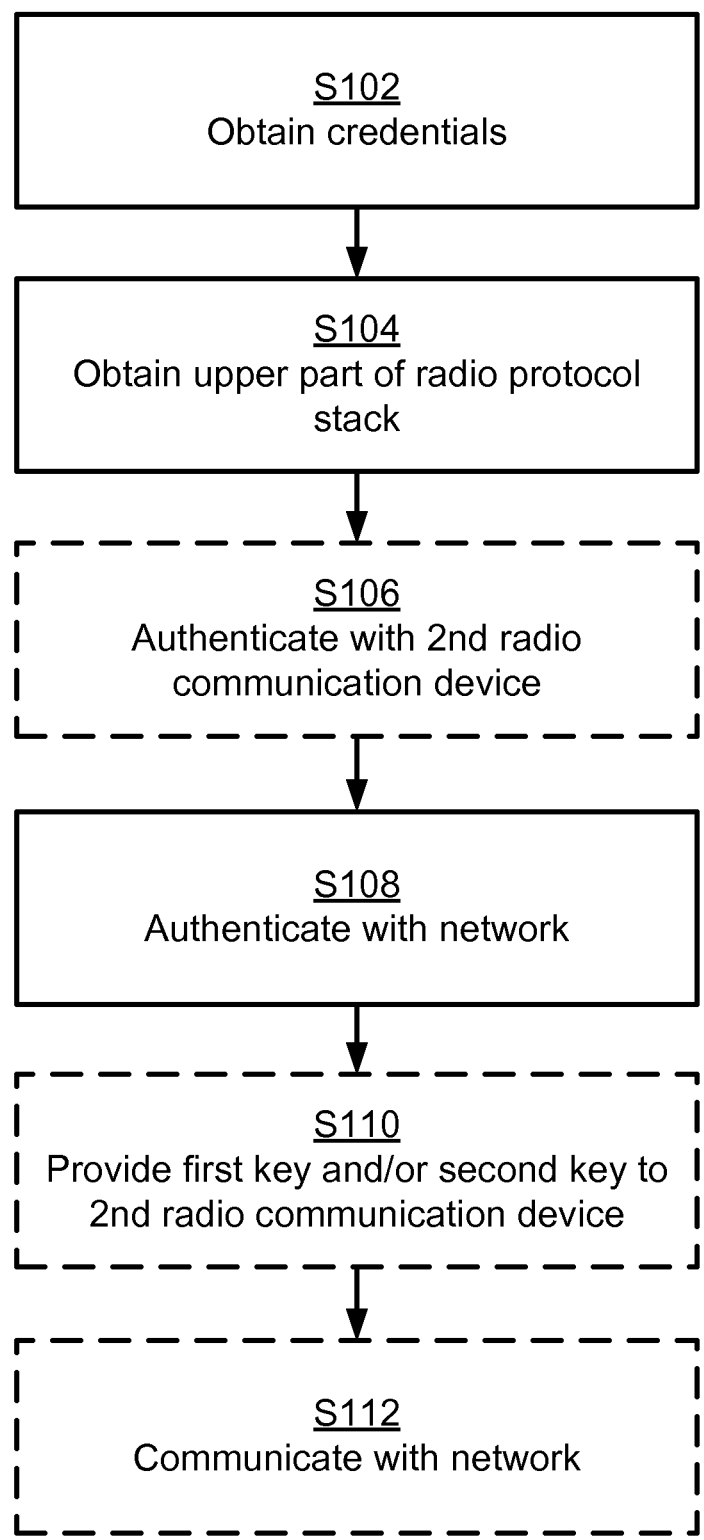
FIGS. 4 and 5 are flowcharts of methods according to embodiments.

Reference is now made to FIG. 4 illustrating a method for authenticating a first radio communication device 200 with a network 400 as performed by the first radio communication device 200 according to an embodiment.

It is assumed that the first radio communication device 200 has access to credentials for a network subscription to the network 400. That is, the first radio communication device 200 is configured to perform step S102:

S102: The first radio communication device 200 obtains credentials for a network subscription to the network 400.

There could be different ways for the first radio communication device 200 to obtain the credentials. In some aspects the credentials are obtained over a wired or wireless interface from another device or server, for example via the second radio communication device 300 or another radio communication device. In other aspects the credentials are obtained already during manufacturing of the first radio communication device 200. Hence, the credentials might be provided in the first radio communication device 200 upon manufacturing of the first radio communication device 200 or on a traditional SIM card of the first radio communication device 200.

It is assumed that the first radio communication device 200 has access to an upper part of a radio protocol stack. That is, the first radio communication device 200 is configured to perform step S104:

S104: The first radio communication device 200 obtains an upper part of a radio protocol stack. The first radio communication device 200 is configured to communicate with the network 400 according to this radio protocol stack.

There could be different ways for the first radio communication device 200 to obtain the upper part of the radio protocol stack. In some aspects the upper part of the radio protocol stack is obtained over a wired or wireless interface from another device or server, for example via the second radio communication device 300 or another radio communication device. In other aspects the upper part of the radio protocol stack is obtained already during manufacturing of the first radio communication device 200. Hence, the upper part of the radio protocol stack might be provided in the first radio communication device 200 upon manufacturing of the first radio communication device 200. Further aspects of the radio protocol stack will be disclosed below.

The first radio communication device 200 is configured for authentication with the network 400. That is, the first radio communication device 200 is configured to perform step S108:

S108: The first radio communication device 200 authenticates with the network 400. During the authentication at least one key is derived from the credentials.

Further aspects of the authentication will be disclosed below.

The at least one key is provided to the second radio communication device 300. That is, the first radio communication device 200 is configured to perform step S110:

S110: The first radio communication device 200 provides the at least one key to the second radio communication device 300. The at least one key is for use by the second radio communication device 300 when executing the remaining part of the radio protocol stack for communication between the second radio communication device 300 and the network 400. In this respect, the at least one key is for use by the second radio communication device 300 when, on behalf of the first radio communication device 200, protecting signalling of the communication between the second radio communication device 300 and the network 400.

Embodiments relating to further details of authenticating a first radio communication device 200 with a network 400 as performed by the first radio communication device 200 will now be disclosed.

There may be different ways for the first radio communication device 200 to perform authentication.

As noted above, the first radio communication device 200 authenticates with the network 400. Particularly, according to an embodiment, the first radio communication device 200 authenticates with the network 400 via the second radio communication device 300.

In some aspects the first radio communication device 200 authenticates with the second radio communication device 300. Particularly, according to an embodiment, the first radio communication device 200 is configured to perform (optional) step S106:

S106: The first radio communication device 200 authenticates with the second radio communication device 300 before authenticating with the network 400.

As noted above, during the authentication with the network 400 at least one key is derived from the credentials. Particularly, according to an embodiment, a shared key is derived from the credentials when authenticating with the network 400. The at least one key might then be derived from the shared key. There could be different examples of the at least one key that is derived from the credentials. In some examples the at least one key is defined by a first key $K_{RRCint}$ and/or a second key $K_{RRCenc}$. That is, in some aspects the first key $K_{RRCint}$ and/or the second key $K_{RRCenc}$ is/are provided to the second radio communication device 300 in step S110. The first key $K_{RRCint}$ and/or the second key $K_{RRCenc}$ might be for access stratum (AS) security, or in some aspects the first key is a key $K_{UPenc}$ for user plane security, between the second radio communication device 300 and the network 400. As the skilled person understands, there might be different examples of the at least one key, such as (but not limited to) NAS keys ($K_{NASenc}$, $K_{NASint}$) or $K_{ASME}$, $K_{eNB}$, $K_{UPint}$ in a 4G telecommunications system and $K_{AUSF}$, $K_{SEAF}$, $K_{AMF}$, $K_{gNB}$, NAS keys ($K_{NASenc}$, $K_{NASint}$), and AS keys ($K_{RRCint}$, $K_{RRCenc}$, $K_{UPint}$, $K_{UPenc}$), in a 5G telecommunications system, etc.

Upon authentication with the network 400 and provision to the second radio communication device 300 of the at least one key, the first radio communication device 200 might communicate with the network 400 via the second radio communication device 300. That is, according to an embodiment, the first radio communication device 200 is configured to perform (optional) step S112:

S112: The first radio communication device 200 communicates with the network 400 via the second radio communication device 300.

When communicating with the network 400 via the second radio communication device 300, signalling in accordance with the upper part of the radio protocol stack, both control plane and user plane, might be provided as payload during local communication between the first radio communication device 200 and the second radio communication device 300.

The radio protocol stack might be associated with a 3GPP profile of the first radio communication device 200. According to an embodiment, the key or keys are linked to the radio protocol stack.

There could be different examples of radio protocol stacks. According to an embodiment, the radio protocol stack is a 3GPP radio protocol stack.

There could be different ways to define the upper part of the radio protocol stack. According to an embodiment, the upper part of the radio protocol stack consists of protocol layers for a non-access stratum (NAS) protocol, and for an authentication and a key agreement (AKA) protocol, or an Extensible Authentication Protocol (EAP) method. According to another embodiment, the upper part of the radio protocol stack can also consist of user plane protocols, such as IP and PDCP.

There could be different ways for the credentials to be stored by the first radio communication device 200. According to an embodiment, the credentials are stored in memory only accessible by a trusted execution environment of the first radio communication device 200, or in generic memory of the first radio communication device 200 where the credentials are encrypted and integrity protected using keys of the trusted execution environment.

There could be different examples of trusted execution environments. According to an embodiment, the trusted execution environment is part of a removable, embedded or integrated Universal Integrated Circuit Card (UICC). That is, the trusted execution environment could be a removable UICC, an eUICC, or an iUICC.

Figure 5:
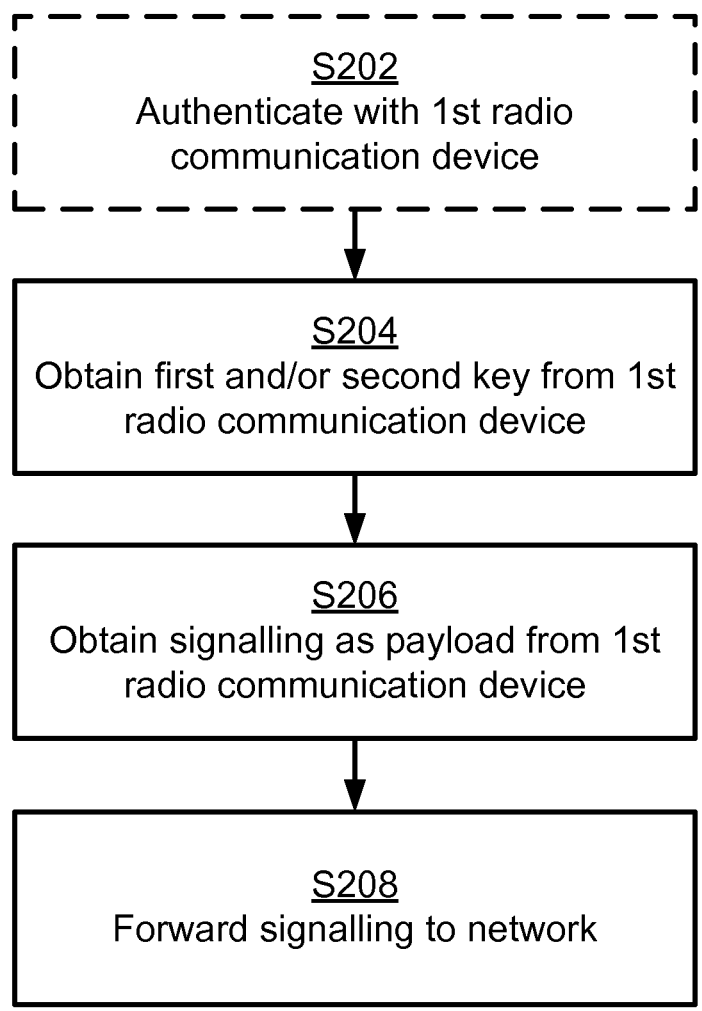

Reference is now made to FIG. 5 illustrating a method for enabling communication between a first radio communication device 200 and a network 400, wherein the first radio communication device 200 is configured to communicate with the network 400 according to a radio protocol stack, as performed by the second radio communication device 300 according to an embodiment.

As disclosed above, the first radio communication device 200 in step S11 provides at least one key to the second radio communication device 300. It is assumed that the second radio communication device 300 obtains the at least one key from the first radio communication device 200. Hence, the second radio communication device 300 is configured to perform step S204:

S204: The second radio communication device 300 obtains at least one key, as derived from credentials of the first radio communication device 200 during authentication of the first radio communication device 200 with the network 400.

As disclosed above, the first radio communication device 200 communicates with the network 400 via the second radio communication device 300. Hence, the second radio communication device 300 is configured to perform step S206:

S206: The second radio communication device 300 obtains, as payload and from the first radio communication device 200, signalling in accordance with an upper part of the radio protocol stack, both control plane and user plane.

The remaining part of the radio protocol stack for communication with the network 400 is executed by the second radio communication device 300. In particular, the second radio communication device 300 is configured to perform step S208:

S208: The second radio communication device 300 forwards the signalling to the network 400, both control plane and user plane, by executing the remaining part of the radio protocol stack. The at least one key is by the second radio communication device 300 used when executing the remaining part of the radio protocol stack. The second radio communication device 300 in this respect uses the at least one key to, on behalf of the first radio communication device 200, protect the signalling between the second radio communication device 300 and the network 400.

Embodiments relating to further details of enabling communication between a first radio communication device 200 and a network 400 as performed by the second radio communication device 300 will now be disclosed.

As disclosed above, in some aspects, the first radio communication device 200 authenticates with the network 400 via the second radio communication device 300.

As further disclosed above, in some aspects, the first radio communication device 200 authenticates with the second radio communication device 300. Hence, according to an embodiment, the second radio communication device 300 is configured to perform (optional) step S202:

S202: The second radio communication device 300 authenticates with the first radio communication device 200 before obtaining the at least one key from the first radio communication device 200.

As noted above, in some examples the at least one key is defined by a first key $K_{RRCint}$ and/or a second key $K_{RRCenc}$. That is, in some aspects the first key $K_{RRCint}$ and/or the second key $K_{RRCenc}$ is/are obtained from the first radio communication device 200 in step S204. As noted above, the first key $K_{RRCint}$ and/or the second key $K_{RRCenc}$ might be for access stratum (AS) security, or in some aspects the first key is a key $K_{UPenc}$ for user plane security, between the second radio communication device 300 and the network 400. Additional examples of the at least one key have been mentioned above. The second radio communication device 300 in this respect uses the at least one key to, on behalf of the first radio communication device 200, protect the AS signalling and/or user plane signalling between the second radio communication device 300 and the network 400.

As noted above, the radio protocol stack might be a 3GPP radio protocol stack.

As noted above, there could be different ways to define the upper part of the radio protocol stack, where the upper part of the radio protocol stack could consist of protocol layers for a non-access stratum, NAS, protocol, and for an authentication and a key agreement, AKA, protocol, or an EAP method. As noted above, according to another embodiment, the upper part of the radio protocol stack can also consist of user plane protocols, such as IP and PDCP.

The second radio communication device 300 might perform the above steps S202-208 with more than one first radio communication device 200 and thus execute the remaining part of the radio protocol stack for communication with the network 400 for more than one first radio communication device 200. In this respect, the second radio communication device 300 might therefore need to perform multiplexing between the all the first radio communication devices 200 and might therefore need to perform monitoring and communication over multiple channels/timeslots.

Figure 6:
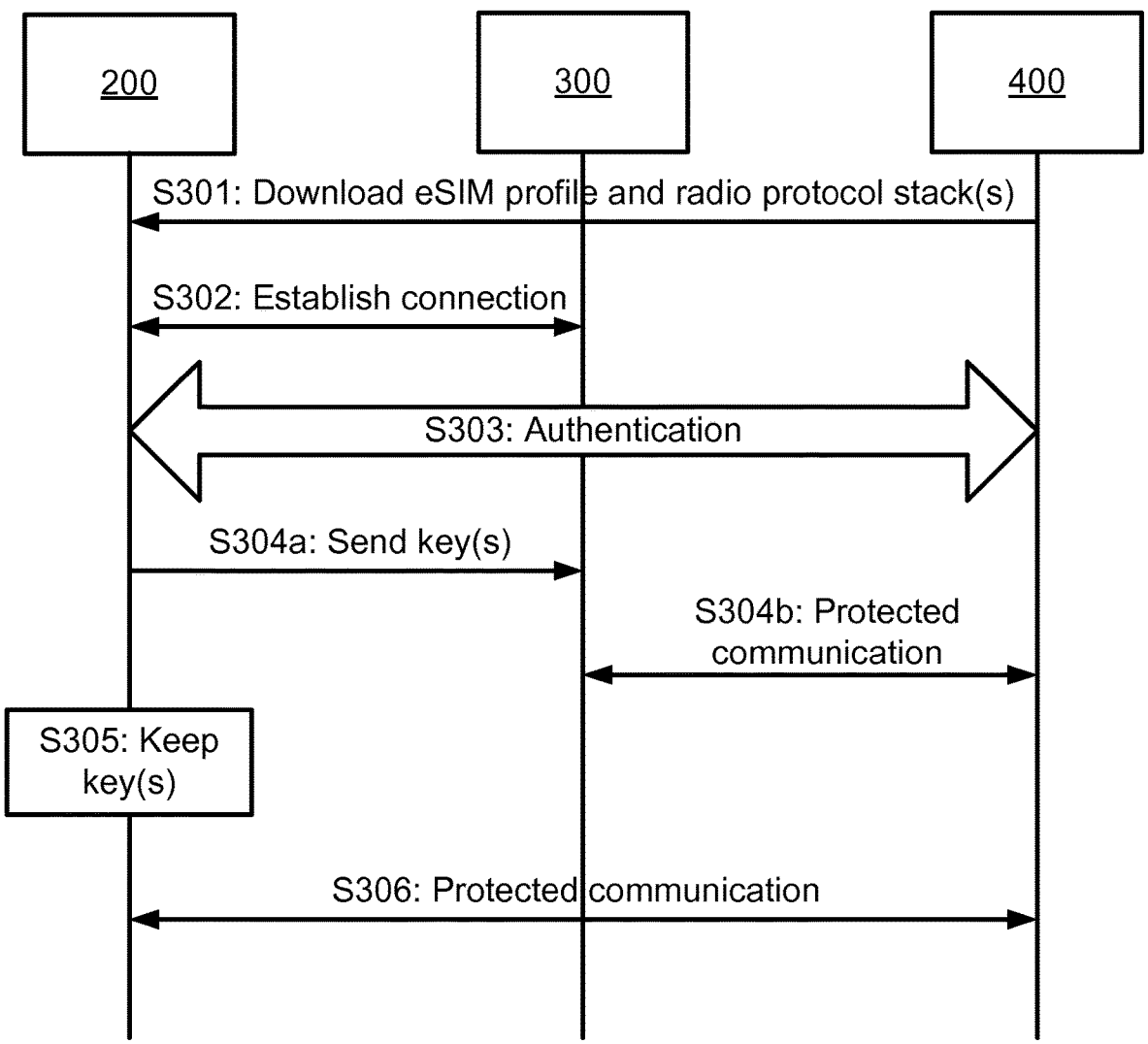
FIGS. 6 and 7 are signalling diagrams according to embodiments.

One particular embodiment for authenticating a first radio communication device 200 with a network 400 and for enabling communication between a first radio communication device 200 and a network 400 based on at least some of the above disclosed embodiments will now be disclosed in detail with reference to the signalling diagram of FIG. 6.

In S301 the first radio communication device 200, optionally, downloads an eSIM profile and needed radio protocol stack(s) from the network 400 or a server, if those are not already available in the first radio communication device 200.

In S302 the first radio communication device 200 establishes a connection to the second radio communication device 300 and negotiates how the radio protocol stack is to be split between the first radio communication device 200 and the second radio communication device 300.

In S303 the first radio communication device 200 runs authentication with the network 400 via the second radio communication device 300 and obtains keys as a result of the authentication.

In S304a the first radio communication device 200 sends keys (1 or more) to the second radio communication device 300, which the second radio communication device 300 uses in S304b to protect communication using the remaining part of the radio protocol stack, which the second radio communication device 300 is running on behalf of the first radio communication device 200.

In S305 the first radio communication device 200 keeps keys (1 or more) which the first radio communication device 200 uses to protect the communication in S306 between the first radio communication device 200 and the network 400 (via the second radio communication device 300).

Figure 7:
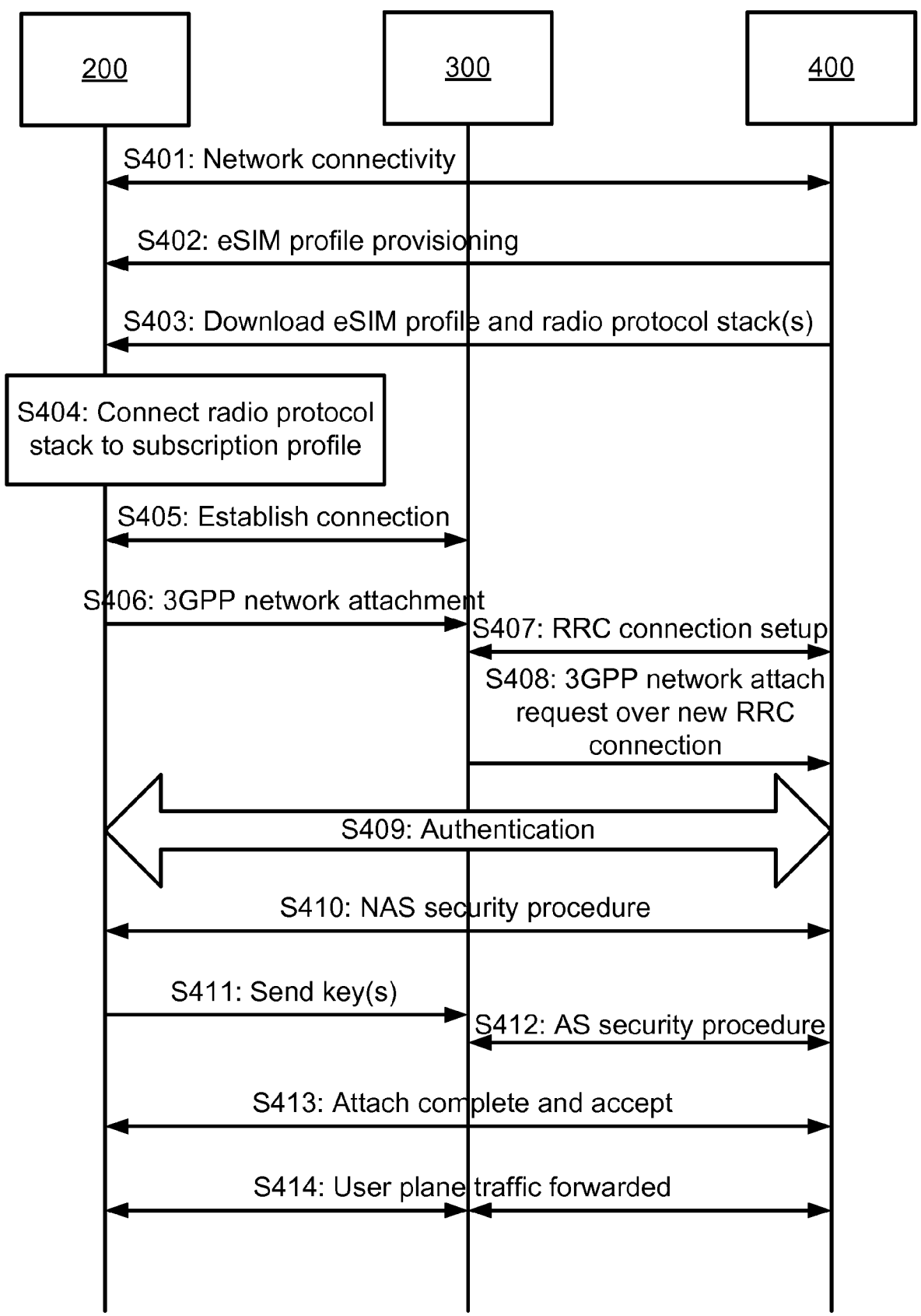

Another particular embodiment for authenticating a first radio communication device 200 with a network 400 and for enabling communication between a first radio communication device 200 and a network 400 based on at least some of the above disclosed embodiments will now be disclosed in detail with reference to the signalling diagram of FIG. 7.

In S401 the first radio communication device 200 obtains network connectivity in order to download needed software components. The network connectivity could be achieved through the second radio communication device 300, through a wireless local area network (WLAN) connection, or e.g. through what is called a primary device in the GSMA eSIM specification, i.e. tethering with another device such, as a mobile phone.

S402 involves GSMA eSIM profile provisioning in which the first radio communication device 200 connects to an eSIM provisioning server (SM-DP+ or SM-DP) based on information obtained (GSMA eSIM for consumer devices: provisioning server information, subscription identifier, optional security code) or provided (GSMA eSIM M2M: device and subscription identifier) when ordering the subscription from the network operator, e.g. from a web page or point of sales of the network operator. The profile is stored and/or installed into a UICC (such as a removable UICC, an eUICC, or an iUICC) of the first radio communication device 200.

In S403, which could be performed before S402, the first radio communication device 200 establishes a connection to a RaaS server, from which the first radio communication device 200 can download the (partial) 3GPP radio protocol stack and a "3GPP radio as a service" application for managing the RaaS usage. This could also be provided from the eSIM provisioning server together with the eSIM profile download, or it could be from another server providing these types of software components.

In scenarios where the first radio communication device 200 already is equipped with the needed software components (e.g. from manufacturing) steps S402 and S403 can be skipped.

In S404 the radio protocol stack is, in the first radio communication device 200, connected to the 3GPP subscription profile of the first radio communication device 200 so that the radio protocol stack can request services from the profile, e.g. by sending AT commands or in other ways request the profile to perform tasks, such as running an attach procedure or AKA. This would typically require some privileges be associated with the radio protocol stack as all requests to the profile are not allowed for just any application. In the case there is a dedicated modem subsystem within the first radio communication device 200 for implementing at least part of the radio protocol stack, there may already be a hardware assisted way of securely communicating via the modem subsystem and the trusted execution environment. In the case the radio protocol stack runs on the main central processing unit of the first radio communication device 200 the access might by the operating system be controlled based on the 3GPP services or capabilities of different software components. For constrained devices or IoT devices with less powerful operating systems, the complete software might be regarded as a monolith and be hardcoded with regards to what each application can access and not access.

In S405, if not already connected to a second radio communication device 300 providing 3GPP radio as a service, the first radio communication device 200 establishes a connection to the second radio communication device 300. The first radio communication device 200 and second radio communication device 300 authenticate and authorize each other and negotiate the used mode of operation (i.e. how the radio protocol stack is to be split between the first radio communication device 200 and the second radio communication device 300).

In S406 the first radio communication device 200 starts a 3GPP attach procedure by sending a NAS attach request containing its subscription identifier, e.g. international mobile subscriber identity (IMSI), to the second radio communication device 300.

In S407 the second radio communication device 300 recognizes the attach request and establishes a new RRC connection to the network 400 on behalf of the first radio communication device 200.

In S408 the second radio communication device 300 forwards the attach request using the new RRC connection to the network 400. The attach request message is not forwarded over a previously established RRC connection already established by the second radio communication device 300 to the network 400. The second radio communication device 300 might also create a state for the first radio communication device 200 and its connection to keep track of messages to and from the first radio communication device 200 and the radio resources, and other parameters, such as keys, allocated to the first radio communication device 200. This might be needed for scenarios where the second radio communication device 300 serves multiple first radio communication devices 200 that utilize the radio interface of the second radio communication device 300 for communication with the network 400.

In S409 the first radio communication device 200 and the network 400 perform mutual authentication.

In S410 NAS security is established between the first radio communication device 200 and the network 400.

In S411, the first radio communication device 200 sends the first key $K_{RRCint}$ and the second key $K_{RRCenc}$ to the second radio communication device 300.

In S412, AS security is established between the second radio communication device 300 and network 400.

In S413, the attach procedure is completed.

From S414 and onwards the first radio communication device 200 generates its user plane traffic, encrypts it and forwards it via the second radio communication device 300. When communicating with the network 400 via the second radio communication device 300, signalling in accordance with the upper part of the radio protocol stack, both control plane and user plane, is provided as payload during local communication between the first radio communication device 200 and the second radio communication device 300. The second radio communication device 300 forwards the signalling to the network 400 by executing the remaining part of the radio protocol stack. The the first key $K_{RRCint}$ and the second key $K_{RRCenc}$ are used by the second radio communication device 300 when executing the remaining part of the radio protocol stack. From the network point of view, the traffic is handled as the traffic belonging to the subscription of the first radio communication device 200. Likewise, traffic from the network 400 to the first radio communication device 200, both control plane and user plane, is delivered via the second radio communication device 300 and its modem to the first radio communication device 200. The second radio communication device 300 uses the state established for the first radio communication device 200 to handle the traffic and radio resources allocated for the first radio communication device's 200 connection.

Figure 8:
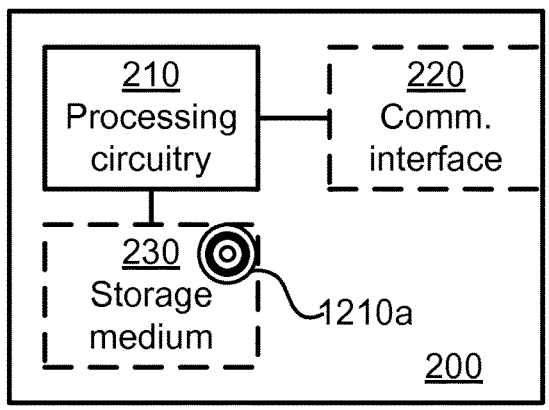
FIG. 8 is a schematic diagram showing functional units of a first radio communication device according to an embodiment.

FIG. 8 schematically illustrates, in terms of a number of functional units, the components of a first radio communication device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1210a (as in FIG. 12), e.g. in the form of a storage medium 230. The processing circuitry 210 may further be provided as at least one application specific integrated circuit (ASIC), or field programmable gate array (FPGA).

Particularly, the processing circuitry 210 is configured to cause the first radio communication device 200 to perform a set of operations, or steps, as disclosed above. For example, the storage medium 230 may store the set of operations, and the processing circuitry 210 may be configured to retrieve the set of operations from the storage medium 230 to cause the first radio communication device 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The first radio communication device 200 may further comprise a communications interface 220 for communications with other entities, functions, nodes, servers, and devices of the communication system 100. As such the communications interface 220 may comprise one or more transmitters and receivers, comprising analogue and digital components.

The processing circuitry 210 controls the general operation of the first radio communication device 200 e.g. by sending data and control signals to the communications interface 220 and the storage medium 230, by receiving data and reports from the communications interface 220, and by retrieving data and instructions from the storage medium 230. Other components, as well as the related functionality, of the first radio communication device 200 are omitted in order not to obscure the concepts presented herein.

Figure 9:
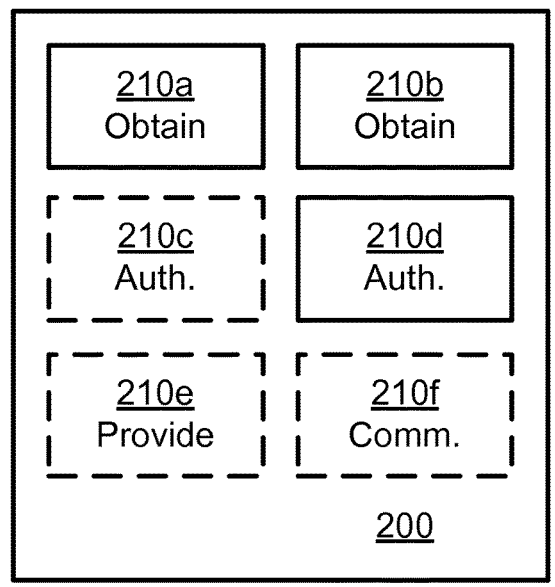
FIG. 9 is a schematic diagram showing functional modules of a first radio communication device according to an embodiment.

FIG. 9 schematically illustrates, in terms of a number of functional modules, the components of a first radio communication device 200 according to an embodiment. The first radio communication device 200 of FIG. 9 comprises a number of functional modules; an obtain module 210*a* configured to perform step S102, an obtain module 210*b* configured to perform step S104, and an authenticate module 210*d* configured to perform step S108. The first radio communication device 200 of FIG. 9 may further comprise a number of optional functional modules, such as any of an authenticate module 210*c* configured to perform step S106, a provide module 210*e* configured to perform step S11, and a communicate module 210*f* configured to perform step S112. In general terms, each functional module 210*a*-210*f* may be implemented in hardware or in software. Preferably, one or more or all functional modules 210*a*-210*f* may be implemented by the processing circuitry 210, possibly in cooperation with the communications interface 220 and/or the storage medium 230. The processing circuitry 210 may thus be arranged to from the storage medium 230 fetch instructions as provided by a functional module 210*a*-210*f* and to execute these instructions, thereby performing any steps of the first radio communication device 200 as disclosed herein.

Figure 10:
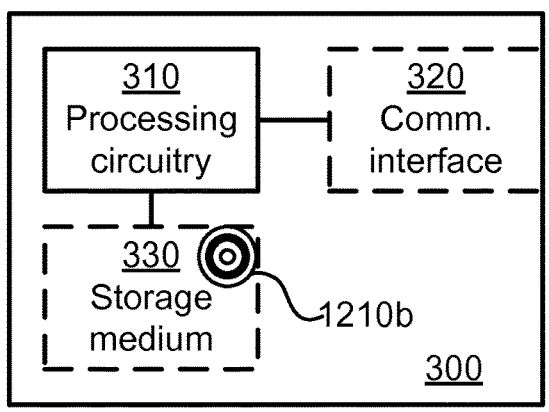
FIG. 10 is a schematic diagram showing functional units of a second radio communication device according to an embodiment.

FIG. 10 schematically illustrates, in terms of a number of functional units, the components of a second radio communication device 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1210*b* (as in FIG. 12), e.g. in the form of a storage medium 330. The processing circuitry 310 may further be provided as at least one application specific integrated circuit (ASIC), or field programmable gate array (FPGA).

Particularly, the processing circuitry 310 is configured to cause the second radio communication device 300 to perform a set of operations, or steps, as disclosed above. For example, the storage medium 330 may store the set of operations, and the processing circuitry 310 may be configured to retrieve the set of operations from the storage medium 330 to cause the second radio communication device 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The second radio communication device 300 may further comprise a communications interface 320 for communications with other entities, functions, nodes, servers, and devices of the communication system 100. As such the communications interface 320 may comprise one or more transmitters and receivers, comprising analogue and digital components.

The processing circuitry 310 controls the general operation of the second radio communication device 300 e.g. by sending data and control signals to the communications interface 320 and the storage medium 330, by receiving data and reports from the communications interface 320, and by retrieving data and instructions from the storage medium 330. Other components, as well as the related functionality, of the second radio communication device 300 are omitted in order not to obscure the concepts presented herein.

Figure 11:
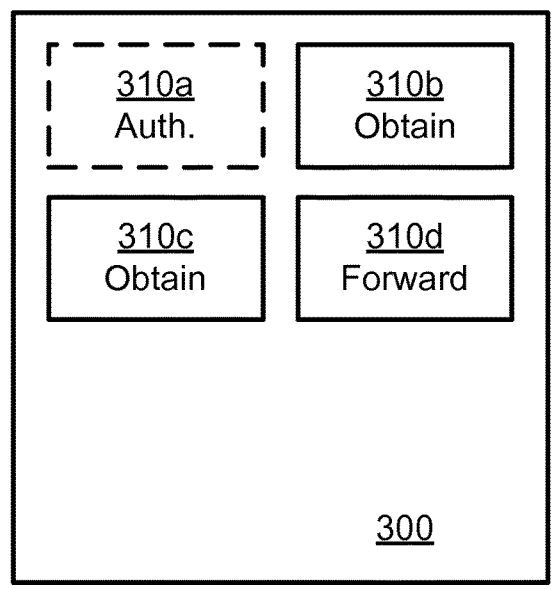
FIG. 11 is a schematic diagram showing functional modules of a second radio communication device according to an embodiment.

FIG. 11 schematically illustrates, in terms of a number of functional modules, the components of a second radio communication device 300 according to an embodiment. The second radio communication device 300 of FIG. 11 comprises a number of functional modules; an obtain module 310*b* configured to perform step S204, an obtain module 310*c* configured to perform step S106, and a forward module 310*d* configured to perform step S108. The second radio communication device 300 of FIG. 11 may further comprise a number of optional functional modules, such as an authenticate module 310*a* configured to perform step S202. In general terms, each functional module 310*a*-310*d* may be implemented in hardware or in software. Preferably, one or more or all functional modules 310*a*-310*d* may be implemented by the processing circuitry 310, possibly in cooperation with the communications interface 320 and/or the storage medium 330. The processing circuitry 310 may thus be arranged to from the storage medium 330 fetch instructions as provided by a functional module 310*a*-310*d* and to execute these instructions, thereby performing any steps of the second radio communication device 300 as disclosed herein.

The first radio communication device 200 and/or the second radio communication device 300 may be provided as respective standalone devices or as a part of at least one respective further device. For example, the first radio communication device 200 and/or the second radio communication device 300. Alternatively, functionality of the first radio communication device 200 and/or the second radio communication device 300 may be distributed between at least two respective devices, or nodes. Thus, a first portion of the instructions performed by the first radio communication device 200 and/or the second radio communication device 300 may be executed in a first device, and a second portion of the instructions performed by the first radio communication device 200 and/or the second radio communication device 300 may be executed in a second device; the herein disclosed embodiments are not limited to any particular number of devices on which the instructions performed by the first radio communication device 200 and/or the second radio communication device 300 may be executed as long as the first radio communication device 200 and the second radio communication device 300 are capable of operating according to the herein disclosed embodiments. Therefore, although a single processing circuitry 210, 310 is illustrated in FIGS. 8 and 10 the processing circuitry 210, 310 may be distributed among a plurality of devices, or nodes. The same applies to the functional modules 210*a*-210*f*, 310*a*-310*d* of FIGS. 9 and 11 and the computer programs 1220*a*, 1220*b* of FIG. 12.

Figure 12:
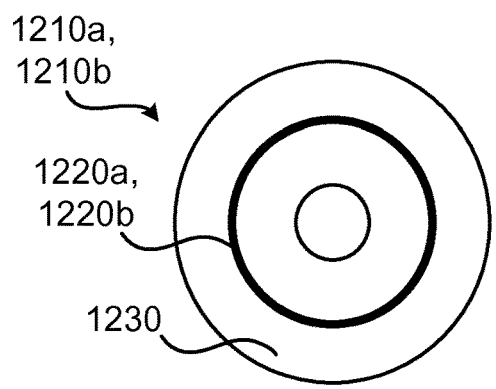
FIG. 12 shows one example of a computer program product comprising computer readable means according to an embodiment.

FIG. 12 shows one example of a computer program product 1210*a*, 1210*b* comprising computer readable means 1230. On this computer readable means 1230, a computer program 1220*a* can be stored, which computer program 1220*a* can cause the processing circuitry 210 and thereto operatively coupled entities and devices, such as the communications interface 220 and the storage medium 230, to execute methods according to embodiments described herein. The computer program 1220*a* and/or computer program product 1210*a* may thus provide means for performing any steps of the first radio communication device 200 as herein disclosed. On this computer readable means 1230, a computer program 1220*b* can be stored, which computer program 1220*b* can cause the processing circuitry 310 and thereto operatively coupled entities and devices, such as the communications interface 320 and the storage medium 330, to execute methods according to embodiments described herein. The computer program 1220*b* and/or computer program product 1210b may thus provide means for performing any steps of the second radio communication device 300 as herein disclosed.

In the example of FIG. 12, the computer program product 1210a, 1210b is illustrated as an optical disc, such as a CD (compact disc) or a DVD (digital versatile disc) or a Blu-Ray disc. The computer program product 1210a, 1210b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1220a, 1220b is here schematically shown as a track on the depicted optical disk, the computer program 1220a, 1220b can be stored in any way which is suitable for the computer program product 1210a, 1210b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for authenticating a first radio communication device with a network, the method being performed by the first radio communication device, the method comprising:
   obtaining credentials for a network subscription to the network;
   downloading a radio protocol stack from the network;
   negotiating how the radio protocol stack is to be split between the first radio communication device and a second radio communication device, wherein the radio protocol stack comprises a user plane protocol and a control plane protocol, the user plane protocol and the control plane protocol are split between the first radio communication device and the second radio communication device;
   based at least on the negotiation, obtaining an upper part of the radio protocol stack, according to which radio protocol stack the first radio communication device is configured to communicate with the network, wherein the upper part of the radio protocol stack corresponds to the user plane protocol;
   authenticating with the network; and
   providing, to the second radio communication device, at least one key, as derived from the credentials during the authenticating with the network, for use by the second radio communication device when executing the remaining part of the radio protocol stack for communication between the second radio communication device and the network.

2. The method according to claim 1, wherein the first radio communication device authenticates with the network via the second radio communication device.

3. The method according to claim 2, further comprising:
   authenticating with the second radio communication device before authenticating with the network.

4. The method according to claim 1 wherein a shared key is derived from the credentials when authenticating with the network.

5. The method according to claim 4, wherein the at least one key is derived from the shared key.

6. The method according to claim 1, wherein the at least one key is for access stratum security or user plane security between the second radio communication device and the network.

7. The method according to claim 1, wherein the at least one key is defined by a first key, key for Radio Resource Unit Integrity (KRRCint), a second key, key for Radio Resource Unit Encryption (KRRCenc), or a third key, key for User Plane Encryption (KUPenc).

8. The method according to claim 7, wherein the first key KRRCint or the second key KRRCenc are for access stratum security, or wherein the third key KUPenc is for user plane security between the second radio communication device and the network.

9. The method according to claim 1 further comprising:
   communicating with the network via the second radio communication device.

10. The method according to claim 1, wherein the credentials are stored in memory only accessible by a trusted execution environment of the first radio communication device, or in generic memory of the first radio communication device, where the credentials are encrypted and integrity protected using keys of the trusted execution environment.

11. The method according to claim 1, wherein the upper part of the radio protocol stack consists of protocol layers for a non-access stratum, NAS, protocol, and for an authentication and a key agreement, AKA, protocol or for an EAP method, or for user plane communication.

12. A method for enabling communication between a first radio communication device and a network, wherein the first radio communication device is configured to communicate with the network according to a radio protocol stack, the method being performed by a second radio communication device, the method comprising:
   negotiating how the radio protocol stack is to be split between the first radio communication device and the second radio communication device, wherein the radio protocol stack being downloaded from the network, the radio protocol stack comprises a user plane protocol and a control plane protocol, the user plane protocol and the control plane protocol are split between the first radio communication device and the second radio communication device;
   obtaining at least one key, as derived from credentials of the first radio communication device during authentication of the first radio communication device with the network;
   obtaining, as payload and from the first radio communication device, signalling in accordance with an upper part of the radio protocol stack, wherein the upper part of the radio protocol stack corresponds to the user plane protocol; and
   forwarding the signalling to the network by executing the remaining part of the radio protocol stack, wherein the at least one key is for use by the second radio communication device when executing the remaining part of the radio protocol stack.

13. The method according to claim 12, wherein the first radio communication device authenticates with the network via the second radio communication device.

14. The method according to claim 13, further comprising:
   authenticating with the first radio communication device before obtaining the at least one key from the first radio communication device.

15. The method according to claim 12, wherein the at least one key is for access stratum security or user plane security between the second radio communication device and the network.

16. The method according to claim 12, wherein the at least one key is defined by a first key, key for Radio Resource Unit Integrity (KRRCint), a second key, key for Radio Resource Unit Encryption (KRRCenc), or a third key, key for User Plane Encryption (KUPenc).

17. The method according to claim 16, wherein the first key KRRCint or the second key KRRCenc are for access stratum security, or wherein the third key KUPenc is for user plane security between the second radio communication device and the network.

18. The method according to claim 12, wherein the upper part of the radio protocol stack consists of protocol layers for a non-access stratum, NAS, protocol, and for an authentication and a key agreement, AKA, protocol, or an EAP method, or for user plane communication.

19. A first radio communication device for authenticating the first radio communication device with a network, the first radio communication device comprising processing circuitry, the processing circuitry being configured to cause the first radio communication device to:
- obtain credentials for a network subscription to the network;
- download a radio protocol stack from the network;
- negotiating how the radio protocol stack is to be split between the first radio communication device and a second radio communication device, wherein the radio protocol stack comprises a user plane protocol and a control plane protocol, the user plane protocol and the control plane protocol are split between the first radio communication device and the second radio communication device;
- obtain an upper part of the radio protocol stack, according to which radio protocol stack the first radio communication device is configured to communicate with the network, wherein the upper part of the radio protocol stack corresponds to the user plane protocol;
- authenticate with the network; and
- provide, to the second radio communication device, at least one key, as derived from the credentials during the authenticating, for use by the second radio communication device when executing the remaining part of the radio protocol stack for communication between the second radio communication device and the network.

20. A second radio communication device for enabling communication between a first radio communication device and a network, wherein the first radio communication device is configured to communicate with the network according to a radio protocol stack, the second radio communication device comprising processing circuitry, the processing circuitry being configured to cause the second radio communication device to:
- obtain at least one key, as derived from credentials of the first radio communication device during authentication of the first radio communication device with the network;
- negotiating how the radio protocol stack is to be split between the first radio communication device and the second radio communication device, wherein the radio protocol stack being downloaded from the network, the radio protocol stack comprises a user plane protocol and a control plane protocol, the user plane protocol and the control plane protocol are split between the first radio communication device and the second radio communication device;
- based at least on the negotiation, obtain, as payload and from the first radio communication device, signalling in accordance with an upper part of the radio protocol stack, wherein the upper part of the radio protocol stack corresponds to the user plane protocol; and
- forward the signalling to the network by executing the remaining part of the radio protocol stack, wherein the at least one key is for use by the second radio communication device when executing the remaining part of the radio protocol stack.

* * * * *